US006178536B1

(12) United States Patent
Sorkin (10) Patent No.: US 6,178,536 B1
(45) Date of Patent: Jan. 23, 2001

(54) CODING SCHEME FOR FILE BACKUP AND SYSTEMS BASED THEREON

(75) Inventor: Gregory Bret Sorkin, New York, NY (US)

(73) Assignee: International Business Machines Corporation, Armonk, NY (US)

(*) Notice: Under 35 U.S.C. 154(b), the term of this patent shall be extended for 0 days.

(21) Appl. No.: 08/911,126

(22) Filed: Aug. 14, 1997

(51) Int. Cl.$^7$ .................................................. G11C 29/00
(52) U.S. Cl. ............................................ 714/766; 714/804
(58) Field of Search ............................... 714/766, 6, 804, 714/758, 805, 763

(56) References Cited

U.S. PATENT DOCUMENTS

| | | | |
|---|---|---|---|
| 4,477,903 | * 10/1984 | Immink et al. | 371/37 |
| 4,495,623 | * 1/1985 | George et al. | 371/38 |
| 4,654,819 | 3/1987 | Stiffler et al. | 364/900 |
| 4,995,041 | 2/1991 | Hetherington et al. | 371/40.1 |
| 5,289,540 | 2/1994 | Jones | 380/4 |
| 5,331,646 | * 7/1994 | Krueger et al. | 371/40.1 |
| 5,369,641 | 11/1994 | Dodt et al. | 371/2.2 |
| 5,379,417 | 1/1995 | Lui et al. | 395/575 |
| 5,428,630 | 6/1995 | Weng et al. | 371/40.1 |
| 5,448,668 | * 9/1995 | Perelson et al. | 395/182.95 |
| 5,513,192 | * 4/1996 | Janku et al. | 371/50.1 |
| 5,778,395 | * 7/1998 | Whiting et al. | 707/204 |

FOREIGN PATENT DOCUMENTS 03271847   12/1991   (JP) .

* cited by examiner

Primary Examiner—Albert De Cady
Assistant Examiner—Shelly A. Chase
(74) Attorney, Agent, or Firm—Ohlandt, Greeley, Ruggiero & Perle, L.L.P.

(57) ABSTRACT

The present invention concerns a method and system for protection against corruption of data. In order to backup files to be stored in a storage medium, a set of redundant parity symbols is computed by encoding cross-sections across said files using a systematic code. These parity symbols and the files are then stored for later retrieval. If some of these files are erased, corrupted, damaged or infected by a virus, they are reconstructed by decoding the surviving files and the parity symbols.

37 Claims, 6 Drawing Sheets

CODING SCHEME FOR FILE BACKUP AND SYSTEMS BASED THEREON

TECHNICAL FIELD

The present invention relates to a novel scheme which allows to protect against limited damage of stored data. In particular, data backup systems, and anti-virus protection systems (including virus disinfection systems) based on the novel scheme are addressed.

BACKGROUND OF THE INVENTION

Error control coding (ECC) is a ubiquitous technique. Many electronic media suffer occasional losses or corruption of data; ECC is any data representation which is robust against such loss or corruption. Most ECC techniques are designed for protection of transmitted data, but the focus here is on protection of stored data.

Typically, coding is to protect against what is called physical errors. Examples are noise on a telephone line, defects on a disk or tape, or even the failure of an entire hard disk (as is protected by a RAID, a Redundant Array of Independent Disks). Protecting the data in such cases is done, first, by dividing it into blocks. Each block is coded independently. Since a code cannot protect against loss of many bits (or generally, symbols) in any block, the system must be designed so that bits in a block are more or less independent. (For example in the RAID, each bit of a coded block is stored on a separate disk. It is relatively unlikely that two disks will fail at once.)

Backing up computer files is typically done by making a duplicate copy of all the data. This means that the backup copy requires just as much space as the original, and to keep costs reasonable, backups are generally consigned to tape or another capacious but slow medium. Backups are so slow and inconvenient that they are often created and managed by a separate organization, and are often not worth using, except in case of catastrophe. Backups are extremely voluminous and time-consuming to make and unwieldy to organize.

In case of logical faults, it is relatively likely that all symbols in a single logical file will be corrupted or erased at the same time, in contradistinction to the physical fault model, discussed above. Computer viruses are one source of logical faults. The unit corrupted by a computer virus is not a disk track or similar physical unit, but a single computer file (usually an executable file). Another example is a user's own inadvertent erasure, change, or over-writing of a valuable computer file.

It is an object of the present invention to overcome the problems of known backup schemes and systems.

It is another object of the present invention to provide a scheme which allows to quickly and efficiently restore data in case of logical faults.

It is a further object of the present invention to provide a scheme which can be used for anti-virus protection.

SUMMARY OF THE INVENTION

The present invention concerns a method for protecting data against logical faults by means of error correction codes allowing to create vastly smaller backups than conventional systems. Under certain circumstances, it may also be employed against physical faults.

The present invention, in order to protect against corruption of logical units data ('files'), employs coded blocks consisting of cross-sections across a number of files, rather than bits from within a single file.

For maximal efficiency (best mode), the data blocks should be cross-sections across all files, in which case the code blocks may be of variable length rather than the usual fixed length.

As with most ECC, limited corruption of the coded data results in no loss of original data, while corruption beyond this point may result in substantial loss.

There is a clear distinction between the present invention and most coding applications to transmission or even storage (including RAID in the latter category). Since the present invention provides for a separate integrity component to stand alongside an independent data system, the codes used must be systematic. To explain, in most applications the data are accessed only through the coded channel. For example, any RAID disk read/write must go through the RAID protocol. In this case the code need not be systematic, which is to say that the data bits need not be present 'in the clear' within the coded data. The data bits and parity bits may be all intertwined, and only get sorted out by the coding and decoding procedures.

According to the present invention, a systematic code is used which acts as an independent component to protect the data integrity of an 'original' system, and the data must be 'in the clear' for the original system. The systematic code preserves the original data bits. Please note that, unlike the data bits, there is no constraint on the parity bits, which are used only by the coding component and not the original system. In other words, when using a systematic code, the codeword still includes the original bits and any system processing or reading the original bits does not need to know what kind of coding scheme is used. It can simply take and process the original bits included in the codeword.

One implementation of the present invention uses an erasure code rather than an error-correcting code. An erasure code can restore bits that have been lost, while an error-correcting code can restore bits that have been lost or corrupted. Technically the difference between them is that the erasure code is 'told' which bits are bad, while the error correcting code is not given this information; the lesser task demanded of the erasure code allows it to operate more efficiently.

Another implementation may make use of an error-correcting code.

In the present applications, the 'bad' symbols are those in 'bad' files, which can be identified by a verification system to be described.

The present invention, and modifications thereof, allow realization of systems which efficiently protect against loss of data.

It is an advantage of the inventive scheme that it is fast and reliable. The storage space needed is much smaller than in case of conventional systems.

It is another advantage of the present invention that the size of the backup is linked to the size of the anticipated damage, and is completely independent of the total size of the files being protected.

It is a further advantage of the present invention that it provides protection against limited damage much more economically by employing an error-correcting code.

The invention also allows rapid update of the redundant coding data comprising the backup as new files are added or deleted. The restore operation is reasonably rapid, so recovery of damaged data is done quickly. The speed and compactness of the present invention allows backups to be done locally and constantly if needed so that the backup is always up to date. This allows putting the entire backup and restore mechanism, according to the present invention, under user control.

The present invention is well suited for use in portable computer systems, such as palm tops and notebooks.

DESCRIPTION OF THE DRAWINGS

The invention is described in detail below with reference to the following schematic drawings.

DETAILED DESCRIPTION OF THE PRESENT INVENTION

The expression files used hereinafter is meant to cover any kind of data files, records or other aggregation of data.

When hereinafter referring to "code", any systematic code is meant to be addressed which is suited for erasure coding or error-correction coding.

The expression "message bits" is used in the standard sense of coding theory to refer to the information of interest to be stored or transmitted. Since the present invention applies to data storage rather than transmission, we shall use the terms "message bits" or "data bits" interchangeably. By contradistinction the expression "parity bits" is used in the standard sense of coding theory to refer to bits that are of no intrinsic interest, but are used to recover data bits in case of errors or erasures.

The present invention, in order to protect against corruption of data, employs coded blocks consisting of cross-sections across a number of files to be protected, rather than bits from within a single file. It is to be noted that these cross-sections across files do not have to be constructed explicitly in order to encode the files to be protected.

Error Correcting Codes (ECC) are described in "The Theory of Error Correcting Codes", by F. MacWilliams and N. Sloane, North Holland, 1977, for example.

Figure 1:
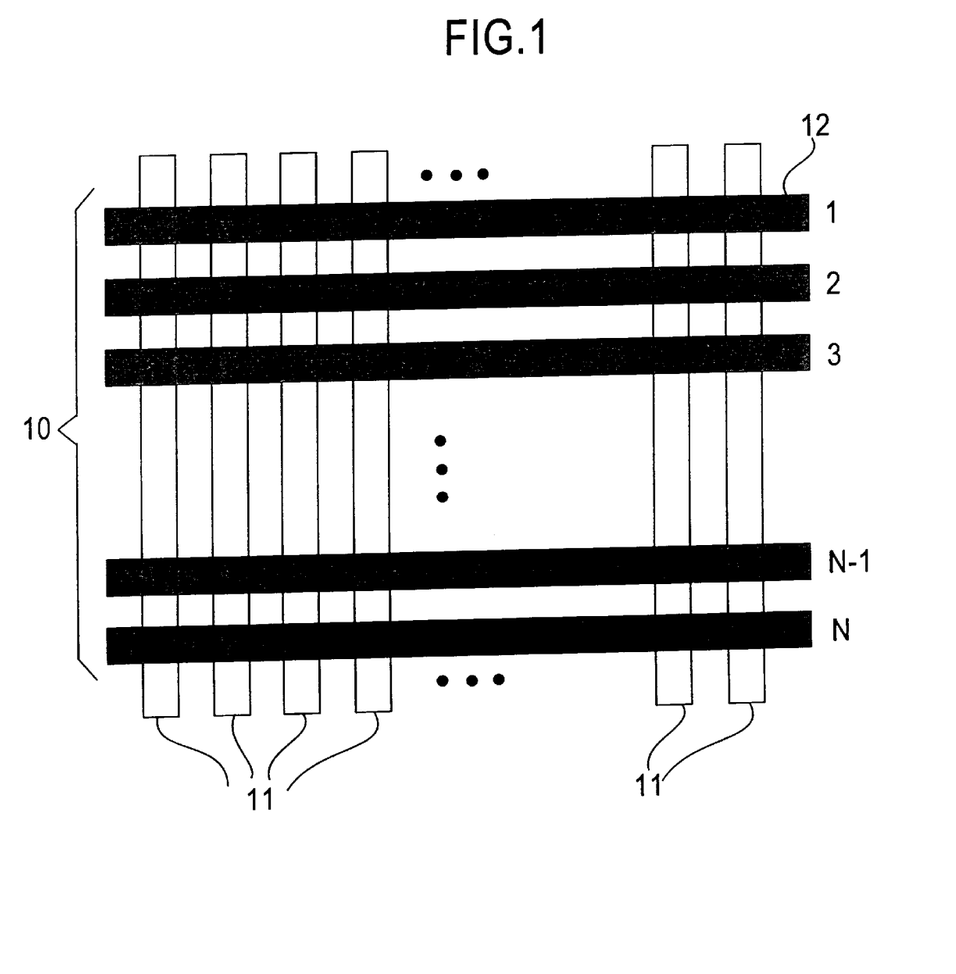
FIG. 1 Shows an example of blocks of message bits to be encoded consisting of cross-sections across N files.

An example of blocks consisting of cross-sections 11 across N files 10 is illustrated in FIG. 1. If a virus, for example, now destroys any or all of file 12, an intact copy of the code blocks 11 would allow the restoration of the information originally contained in this file 12, as will be described in the following.

Figure 2:
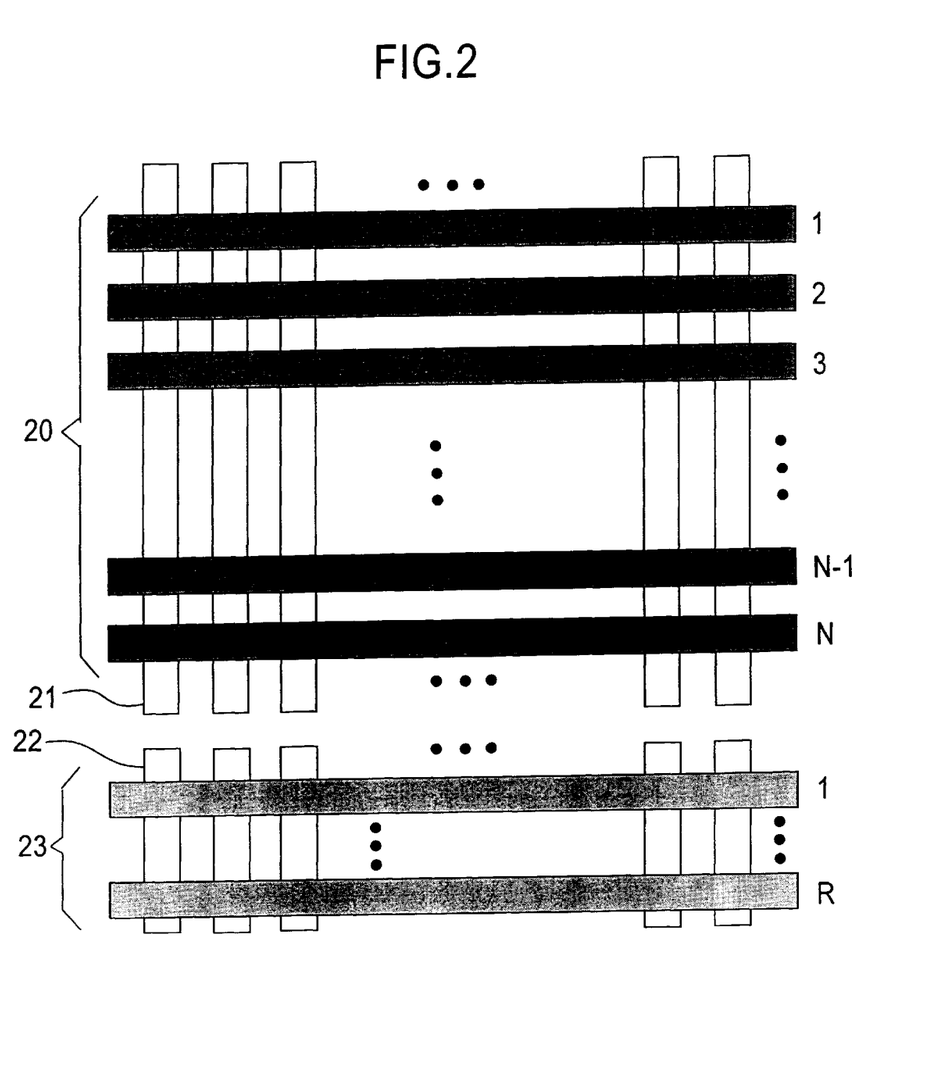
FIG. 2 shows a system, according to the present invention, which is in a verified state with a complete set of parities computed. The files of this system all have the same length.

Instead of storing the blocks 21 being cross-sections of the files 20 to be protected (this would simply double the amount of storage space needed because basically the whole files are duplicated), according to the present invention, these blocks 21 are encoded using a systematic code. The encoding of these blocks 21 generates parity blocks 22 which can also be thought of (and optimally stored) as parity files 23, as schematically illustrated in FIG. 2.

There is a clear distinction between the present invention and most coding applications to transmission or even storage (including RAID in the latter category).

The present invention provides for a separate integrity component (the parity bits 22/23) to stand alongside an independent data system (e.g. the files 20) since systematic codes are used. The data (files 20) can still be read without requiring any knowledge about the coding scheme used for protection against data losses.

The invention works in two phases. An application-specific "verification" module determines whether the files (data) are in an acceptable state, or, if not, which files are damaged.

Upon such verification, the "coding" phase generates, or updates, encoded parity bits for the current, verified files (data bits). Alternatively, in the event that verification fails, decoding is used to restore the lost or damaged files with the assistance of the parity bits stored.

In a preferred implementation the inventive verification and encoding schemes are applied to the entire collection of files (set of files) or other logical units, but in general, they may be applied to subsets of them: those in a single directory, in arbitrary fixed-size collections, or in other subsets.

A preferred code would have the ability to update the parity bits very quickly if only a few data bits (files) have changed. In addition, a preferred code would have the property that the parity bits corresponding to all-zero data bits are very easily determined, for example the parity bits may also be all zeros.

For a code with the above properties, in a preferred implementation the encoding of a set of data files is computed by a sequence of "updates". The parity bits begin as all zeros, corresponding to an implicit set of all-zero data files. One by one, the data files are implicitly "updated" from the implicit all-zero state to the actual value, and the parity bits are updated corresponding to this data update.

In the following, three implementations of the present invention are addressed.

First Implementation:

The first implementation is suited for anti-virus protection of files stored in a computer system, for example. A verification is a scan by an anti-virus program. The anti-virus program serves as "verification" module which allows identification of corrupted files. The files of the computer system are in an acceptable state if no viruses are found. If viruses are found, the virus-infected files are identified by the "verification" module (i.e. by the anti-virus program in the present example). Then, these files are restored by using parity bits computed and stored before these files were damaged (perhaps while they were stored). Details will be addressed later. If no viruses are found, the computer system is deemed to be in an acceptable state, and the parity bits may be updated or re-generated in their entirety, to reflect files that are new or changed since the previous verification.

Second Implementation:

This implementation is an elaboration of the first implementation, adapting it for a combination with the technique of generic virus disinfection. Generic disinfection is the repair of a file infected with a computer virus that is unknown or not specifically described. Details of generic disinfection are addressed in co-pending U.S. patent application with application Ser. No. 342,520, filed on Nov. 21, 1994, with title "Generic Disinfection of programs infected with a computer virus". This U.S. patent application is herewith incorporated by reference. To compensate for lack of information about the virus, generic disinfection may require that some information about each file is saved prior to its infection. Typically, the amount of this so-called "redundant"information might be 50 bytes per file, but since each bit or byte can be treated separately, one can talk about it as if it were a single bit. The second implementation saves this redundant bit only in a virtual sense: the redundant data bits for all files are generated and from them a set of parity bits is computed by means of encoding, and then the data bits are discarded. In a preferred implementation the corpus of redundant information is never stored in its entirety, but rather the parity bits are computed as a series of code updates as, file by file, the redundant information is "updated" from an implicit all-zero state to the proper redundant information for that file. Thus if N data files are protected with p parities, instead of saving N bits (for example 50N bytes in total), the inventive scheme saves only p bits (or 50p bytes in total in this example), a much smaller number.

If viral damage is detected by a "verification" module, a sequence of steps is triggered. First, the 50-byte redundant information for damaged files is recovered by decoding the stored parity information and the 50-byte redundant information for the undamaged files. In a preferred implementation the 50-byte redundant information for the undamaged files is computed on demand, as it is required by the decoding procedure, so that the corpus of such redundant information never needs to be stored in its entirety. The 50-byte redundant information for each damaged file is supplied to the generic disinfection procedure along with the damaged file itself to repair the file. Finally, a fresh verification step may be performed by said "verification" module.

In other words, the use of the present invention in combination with a virus disinfection system only requires storing the associated backup information and not the 50 bytes of redundant information per file (please note that the number of 50 bytes is an example only, and is used for sake of simplicity).

If ever a file's generic disinfection is needed, what happens is this. The generic disinfection information is now computed for all uninfected files by the usual procedure. In combination with the stored parity "backup" information, this now allows the restoration of the generic disinfection information for the those files which were infected. Finally, this information is provided to the generic disinfection procedure to repair the infected files in its usual manner.

Third Implementation:

The third implementation is for limited backup and restore. If a user has inadvertently deleted a file, the present invention allows him to call for a verification that will report an unacceptable data state. This verification is done by an appropriate "verification" module. The respective files are then restored by decoding of parity bits stored before the inadvertent deletion occurred. Verification may be triggered by the user or automatically, for example at pre-set times, and can take into account user input (such as identities of files he believes he has destroyed) as well as any other evidence of filesystem integrity.

The encoding and decoding phases may be the same for any of these three exemplary implementations of the present invention. Upon unsuccessful verification, the parity bits are used to restore the data bits from damaged files (which may be thought of as being erased files).

Upon successful verification, new parity bits may be computed from the data bits (files) if an alteration or modification of these files has occurred or is likely to have been occurred. Please note that new parity bits (referred to as update) do not necessarily need to be computed whenever a verification was successful. This depends on the computing power available as well as on other circumstances.

Choices of Codes:

Any systematic error-correcting code or erasure code may be used in the present context. A preferred code is an erasure code
- in which the number of parity bits is as small as possible compared with the amount of data that can be reconstructed;
- in which the encoding to compute the parity bits is as quick as possible; and
- in which the decoding to restore data bits can also be computed reasonably quickly.

In addition, a preferred code would have the ability to update the parity bits very quickly if only a few data bits (files) have changed.

The field of error-correcting codes is a vast one, and many codes might be employed for the present purpose. A code is a mapping f: $\{0,1\}^N \to \{0,1\}^{N+R}$ in which N "message" bits of a file are converted to a larger number N+R of "message" (or "data") bits and "parity check" (or "parity") bits, with the property that if some of the N+R bits are lost or corrupted, the original N-bit message can still be recovered by decoding.

A code is called "systematic" if the original N message bits are among the N+R encoded bits. As mentioned above, the present invention requires the use of systematic codes. If a code is systematic, it is sufficient to save the R parity-check bits. If the code were not systematic, it would also be necessary to save the N bits of the codeword. This alone, contributing N encoded bits for every N original bits, would double the size of the data to be stored.

Another relevant property is whether the code is an "error-correcting code"or an "erasure code". The preferred implementation of the present invention uses an erasure code, but the invention can also be used in connection with error-correcting codes. Error-correcting codes allow a limited amount of erroneous data to be corrected. Erasure codes are more limited in that for decoding (file restoration in the present context), they require that it be specified which data are in error. The name "erasure code" follows from an equivalence between the erasure of data and the knowledge of what data may be in error. If data is missing, it can be replaced with nonsense data (data known to be erroneous). If it is known that data may be in error, it can be erased. In either case erasure codes are appropriate to repair it.

In case erasure codes are used for the present invention, means are required which allow determination of whether files are in error. For example, a checksum of each file may be compared to saved checksums. Depending on the implementation, the "verification" module may require appropriate means to allow determination of whether files are in error or not.

A second property is whether the code repairs all possible errors of the allowed type (e.g. the erasure of any D files), or merely repairs most errors of that type (allowing recovery from the erasure of D files with high probability). The preferred implementation uses codes of the second type, which repair errors or erasures with high probability.

The time- and space-efficiency of the code are important. If there are N files altogether and the code is to protect against the erasure of up to D files, the question is what the size R of the parity check data is. On information-theoretic grounds R≧D. In a preferred implementation R is about two times D. In other codes, especially error-correcting codes, R can depend on N, which is likely to create overly bulky codes.

In one implementation of the present invention, the ith bits of all N files being backed up define the N message bits of a codeword. These codewords are herein also referred to as cross-sectional data blocks. The R parity check bits (also referred to as set of parity symbols or simply parities) of that codeword are saved as the ith bits of what are conceptually R backup files. In practice, these may in fact be saved as R files (see 23 in FIG. 2, for example), as we shall assume for simplicity in the following, or they may be combined into one file. If up to D of the data and parity files are erased (or up to D files are damaged and it can be determined which ones), then the inventive scheme allows the data files to be restored, using the surviving N+R−D files. (Depending on the code employed, it may be required that erasures or errors can only occur to the data files, and not to the parity files, and this may be an acceptable constraint if the parities can be stored in a very reliable manner.) The code to be used for the present implementation uses only the exclusive-or (XOR) operation on bits, and may perform this operation on a byte, word, or other unit of bits at once, for increased efficiency.

Because conceptually a cross-section of the original files is taken (the ith bits of all N files are treated together), according to the present invention, there is an implicit assumption that all files have the same length.

Figure 3:
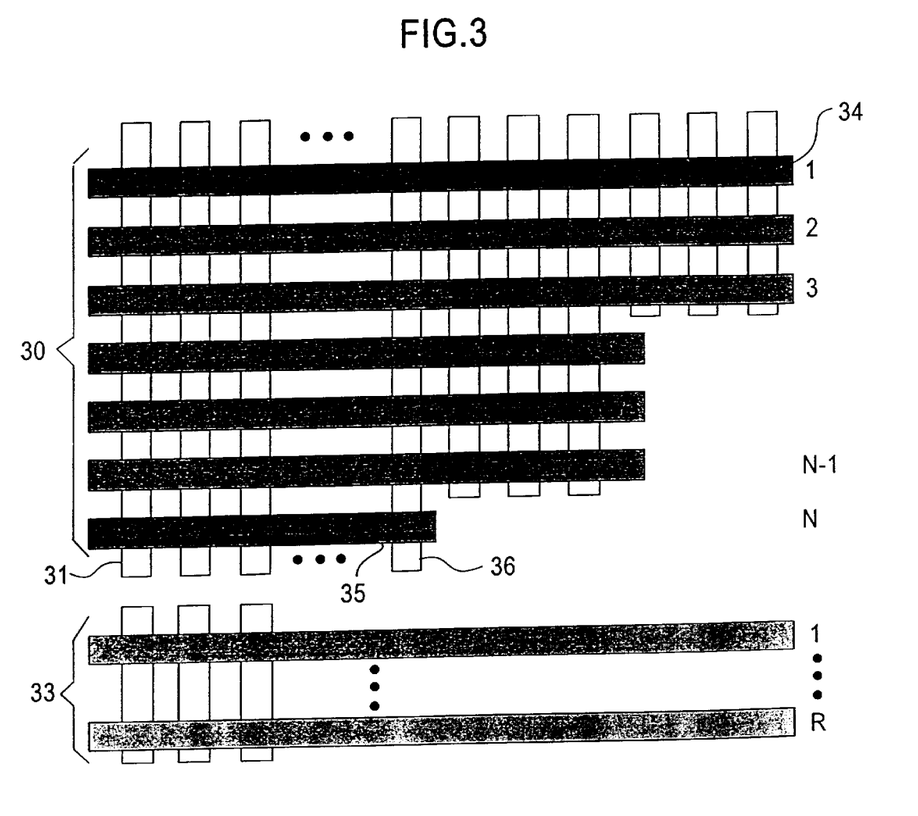
FIG. 3 shows a system, according to the present invention, which is in a verified state with a complete set of parities computed. The files of this system are of variable length.
Figure 4:
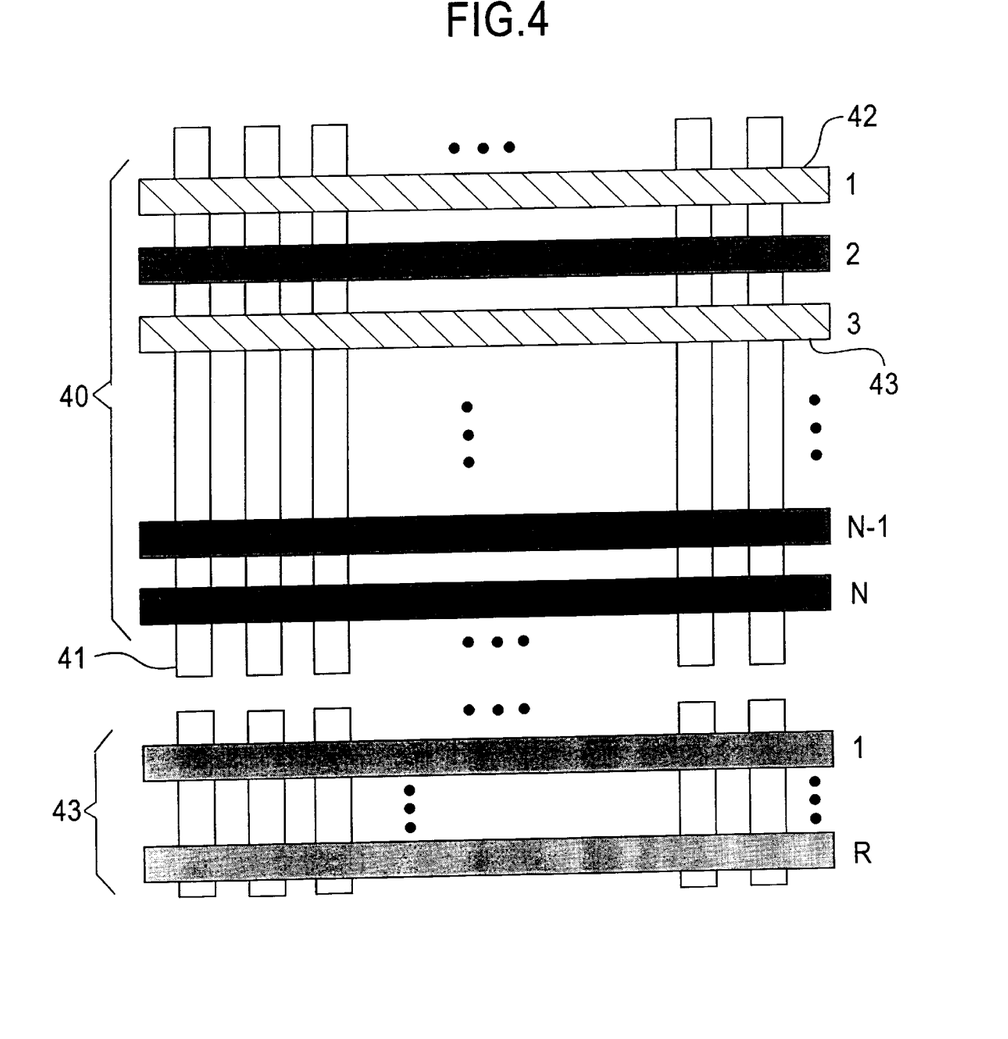
FIG. 4 shows a system, according to the present invention, which is in an unverified state, with two files being damaged. The parities can be used to restore the two damaged files thereby returning the system to a state that will verify successfully.

In cases where files 30 are of variable length, the code blocks may be of variable length rather than the usual fixed length. An example is illustrated in FIG. 3. The file 34 is longer than file 35, for example. Due to this, the blocks consisting of cross-sections across a number of the files 30 are of different length. Please note that block 31 is longer than block 36, for example. The inventive scheme can handle such blocks of different length.

In case that blocks of different length are not desired or accepted, it is possible to treat all files as if they were of a fixed length. For encoding and decoding purposes, bits past the true end of shorter files are then treated as zeros. Longer files may be ignored, in which case they would not be recoverable by means of the present invention. Alternatively, longer files may be broken into blocks of the fixed length, the last block padded with zeros, if necessary. In this case, the invention's erasure tolerance will apply to a number of blocks rather than files, and the inventive scheme will be able to restore erased data if, for example, a small number of large files is deleted, or a large number of small files.

One code which could be used to implement the present invention is described by Michael G. Luby, Michael Mitzenmacher, M. Amin Shokrollahi, Daniel A. Spielman, and Volker Stemann in the article "Practical Loss-Resilient Codes", appearing in the Proceedings of the 29th Annual ACM Symposium on the Theory of Computing, 1997.

For whatever code is to be used in connection with this invention, one wishes the amount of redundancy (the number of parity bits) to be small, and encoding to be fast. In particular, if encoding the data on a disk, it is desirable to be able to update the coded words in constant time when a single bit of data is updated. One implication of this taxing constraint is that each original bit of a file affects on average only a constant number of "parity bits". Finally, decoding must be practicable, although if error events are rare, it need not be as fast as encoding. Decoding time linear in the size of the total data volume is acceptable.

In a preferred implementation of the invention, the code used is a "two-tree" binary code, presented in the following, which has all the desirable properties enumerated above. It guards N-bit words against a small number D=o(N) of random erasures, using only 2D+o(D) parity check bits. Encoding takes linear time, O(N), while updates take time O(1) when a single message bit is changed. Decoding is almost always successful, takes time O(N) in the worst case, and takes expected time O(NE/D) if only E bits were erased.

We note that while coding against random erasures can be accomplished with O(D) parity check bits, any code protecting against arbitrary erasures, random errors, or arbitrary errors provably requires $\Theta(D \lg(N/D))$ parity bits.

In addition to being compact, the two-tree codes for the random erasure case are systematic, linear, and sparse: the message bits (or data) of the codeword are the original bits, the parity bits of the codeword are a linear function of the original bits, and the matrix describing this linear function is sparse.

The two-tree code for random erasures detailed in the following is strikingly simple. It is an elaboration of a "tree code", also described in the following, whose data bits are edges between parity-bit vertices, and where the value of a "parity" vertex is the exclusive-or of all its incident "message" edges. Decoding is accomplished by identifying the forest induced by the erased bits, recovering from the values of leaf vertices the values of their incident edges, then stripping away these leaves, repeating until there is nothing left.

Sparse Linear Codes:

A binary linear code is described by a N×(N+R) generator matrix G of bits, so that the codeword x corresponding to a word u is x=uG. Such a code is also systematic if one may write G=[I|G'], the concatenation of the identity matrix and a N×R matrix G', so that x is the concatenation (u, uG') of the message bits u and parity bits uG'.

In the following, the efficient codes that may be used in connection with the present invention are introduced.

An R-bit "tree code" is a systematic binary linear code with generator matrix [I|G'], where G' is an N×R matrix having 2 ones in each row, and zeros elsewhere, and the ones are positioned randomly and independently for each row.

One may think of G' as the incidence matrix of a random graph with N edges (the message bits) on R vertices (the parity bits). Under certain circumstances, if the errors that occur are themselves random, it may be possible to relax the requirements on the randomness of the code.

Theorem 1:

The encoding for a tree code can be computed in time O(N).

Method: In the graph view, the value of each parity bit (vertex) is the sum (modulo 2) of its incident message bits (edges). If G' is represented, for example, as a linked list of the edges incident on each vertex, these sums can be computed in time linear in the number of edges, which is exactly N.

Theorem 2:

Suppose that in a codeword x of a tree code given by G', at most D message bits are erased, and no parity bits are erased. Further suppose that the subgraph of the incidence matrix of G' given by the erased parity bits (edges) is a forest. Then the message u, with x=[I,G']u, can be decoded correctly, in time O(N), and in expected time O(ND/R).

Method: In the full graph G', all vertices (parity bits) have known values (by assumption none were erased), all edges have values 0, 1, or unknown, and the value at each vertex is the sum (modulo 2) of the values (known or unknown) on its incident edges.

This "summation property" is preserved if each known edge value is subtracted from (equivalently, added to) the values of its incident vertices, and then deleted from the graph. This can be done in time O(N). What remains then is the graph of "erased" message bits (edges with unknown values) on the parity bits (vertices with known values). By assumption it is a forest.

A leaf-edge's value can be decoded immediately as the value of the leaf. Subtracting the edge's value from its two incident vertices, and deleting it from the graph, preserves the summation property. This can be done in time O(R), for a total time of O(N+R)=O(N).

Expected time O(kb/r) is achieved if instead of deleting all known-value edges initially, we only delete edges as needed. Specifically, it is only necessary to delete known-value edges which share vertices with edges of unknown value. Since there are D edges of unknown value, there are at most 2D vertices incident upon them. The average degree of a vertex is 2N/R, so the expected number of known-value edges on the selected vertices is at most 4ND/R.

Suppose that in coding for correction of random erasures, it is given that no parity-check bits will be erased. For example, in an application where we are to protect stored data, perhaps the parity-check bits can be stored separately, in a high-integrity medium.

Theorem 3:

Let $c<½$ be a constant. From a codeword x from a tree linear code with N message bits and R parity bits, let cR message bits be erased at random. Then all but o(R) of the bits of x can be recovered, with probability tending to 1 as $R \to \infty$.

Proof: The subgraph of erased message bits is likely to be dominated by a forest, as follows from elementary facts about random graphs; see for example E. M. Palmer's "Graphical Evolution", Wiley, 1995. The Theorem then follows from Theorem 2.

Now, one just augments the code so that one will be able to pick off the remaining bits of a file.

An (R, R')-bit two-tree code is a binary systematic linear with generator matrix [I|G'], where G' is the concatenation of an N×R matrix G1 having 2 ones in each row, zeros elsewhere, and an N×R' matrix G2 also having 2 ones in each row, zeros elsewhere, and the ones are positioned randomly and independently in each row of G1 and G2.

Theorem 4:

Let $c<½$ be a constant. From a codeword x from a two-tree code with N message bits and R+R' parity bits, let cR message bits be erased at random. Then all the message bits can be recovered, with probability tending to 1 as $R \to \infty$ and $R' \to \infty$. The decoding takes time O(N), and if $E \leq cR$ message bits are erased, takes expected time only O(NE/R).

Method: From the first set of r parity bits, i.e. the matrix G1, with probability tending to 1 all but ω(R)=o(R') of the erased message bits can be recovered as previously described. From the second R' parity bits, i.e. the matrix G2, with probability tending to 1, the same method recovers absolutely all the remaining ω(R) bits. The fact that the second phase can with high probability recover absolutely all the remaining erased bits, not just almost all of them, follows from the fact that the number of such bits is o(R'), and from elementary facts about sparse random graphs; see for example E. M. Palmer's "Graphical Evolution", Wiley, 1995.

As our final remark on the two-tree codes, we note that under certain constraints on the number of message bits, the number of parity bits, and the erasure probability, the same methods will with high probability recover all the message bits when random erasures occur over the entire codeword, i.e. over both the message bits and the parity bits.

Further implementation details:

As mentioned, systematic codes are used to generate the parity bits. There is no constraint on the number of parity bits, because these bits are used only by the encoding and decoding component and not the original system which still can read the files, or data thereof, without having to know anything about the codes and coding scheme used.

As explained above, either an erasure code or an error-correcting code can be used.

Figure 5A:
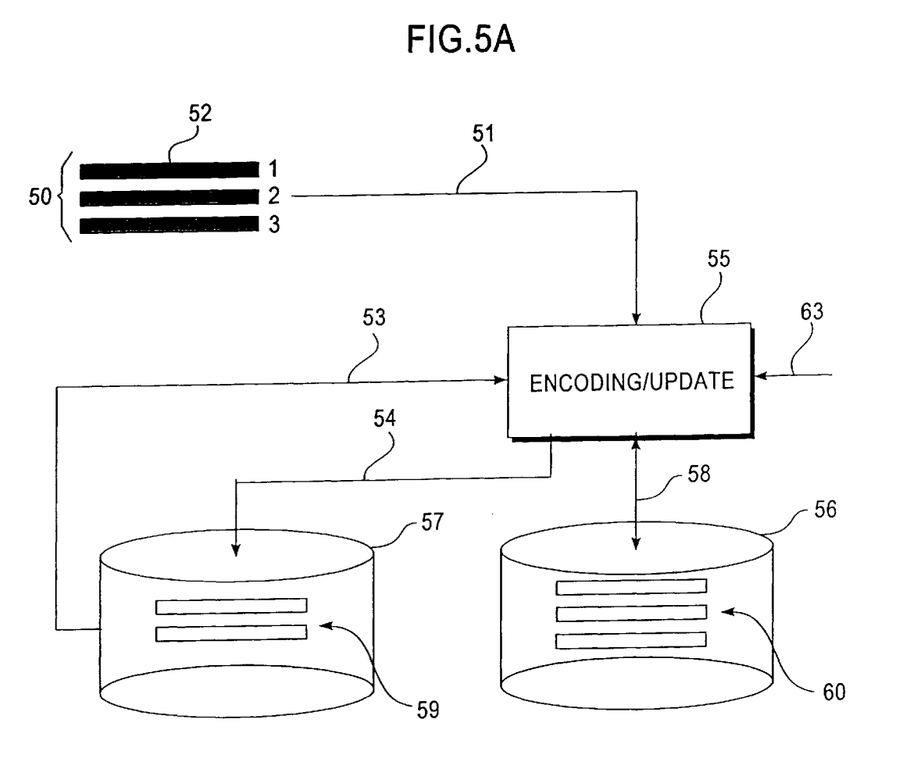
FIG. 5A illustrates a first embodiment of the present invention where files are to be stored in a storage section.
Figure 5B:
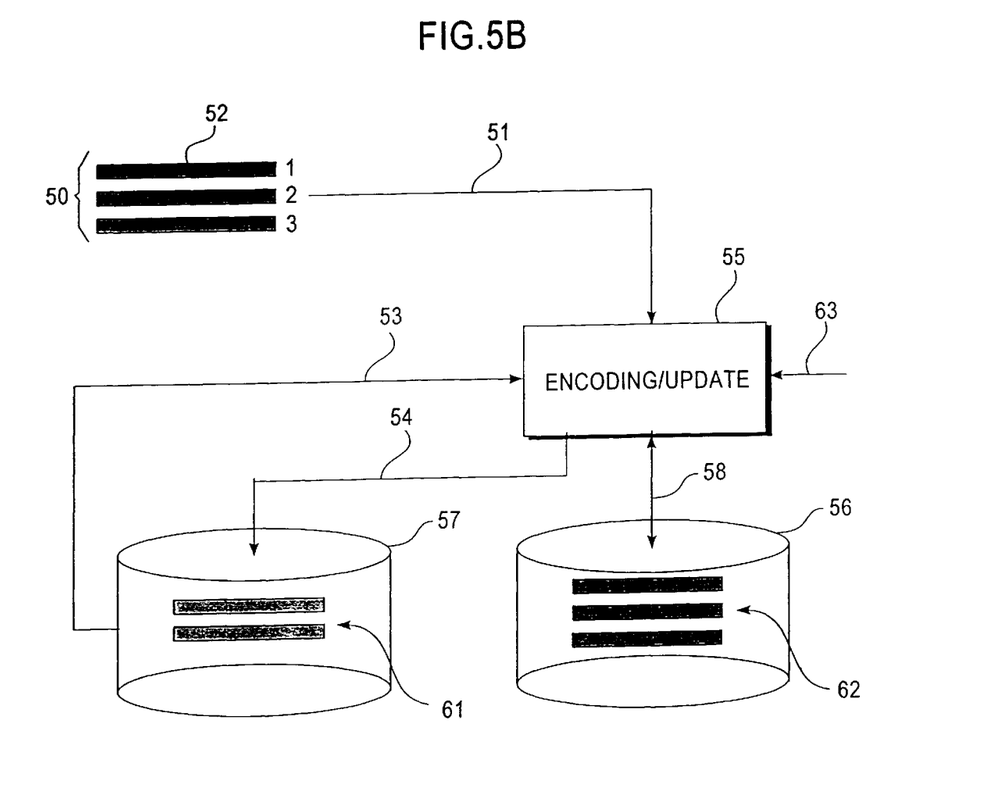
FIG. 5B illustrates a first embodiment of the present invention where files have been stored in a storage section and a set of parity check bits (parities) has been computed and put in another storage section.

An inventive system for storing files and parity bits for later recovery is illustrated in FIGS. 5A and 5B. A set 50 of files 52 which are to be stored, is shown on the upper left hand side of FIG. 5A. The system comprises an encoding/update unit 55, a first storage section 56, and a second storage section 57. These two storage sections may be provided within one and the same storage device (e.g. a disk drive system) or the two sections may be provided on different systems. If no files are stored in the first storage section 56, this storage section is padded with zeros, as indicated by the blank boxes 60. Also the parity bits are set to zeros, as indicated by the blank boxes 59.

The files 50 to be stored are now fed via line 51 to the encoding/update unit 55 where they are processed. These files 52 can either be fed into the unit 55 sequentially or in parallel. Depending on the coding scheme used, registers may be employed in unit 55 to store all or part of the files while being encoded. As described above, cross-sections of the files 50 are encoded using a systematic code. As a result of this encoding process, a set of parity bits is generated which is stored via line 54 into storage section 57, as illustrated in FIG. 5B (the grey boxes 61 are the parity bits generated). At the same time, the files 50 are forwarded via line 58 to the first storage section 56, as shown in FIG. 5B (the black boxes 62 correspond to the files 50). Please note that there is a feedback line 53 between the section 57 where the parity bits are stored and the encoding/update unit 55. If an update of the files 62 is required, e.g. because some files were corrupted, or if part of these files have been intentionally modified, for example, the parity bits 61 and the files 62 are fed back to the encoding/update unit 55 for decoding and updating. These updated files are then written into the storage 56. Please note that, due to the fact that systematic codes are used by the encoding/update unit 55, the files 62 in storage section 56 can be read as usual. I.e. these files 62 are stored in a form "in the clear".

In a preferred implementation the encoding and update are done by one and the same unit. Please note that the encoding part and the update part of the encoding/update unit 55 can also be implemented separately. Under certain circumstances the encoding (e.g. the initial encoding) can be done in a different way than the updating.

Verification modules are addressed in the following. A verification module is employed to determine whether the stored files (data) are in an acceptable state, or, if not, to identify which files are damaged. The verification module is application-specific. There are many different way to realize such a verification system. It may either be implemented in hardware, in software (e.g. anti-virus software), or as combination of software and hardware. The module may comprise a block which detects viral damage, for example. In another implementation, the verification process may be triggered by the user, if he/she has inadvertently deleted a file, for example. In turn, the verification process will report an unacceptable data state.

Optionally, a verification may be triggered automatically, for example at preset times. It may take into account user input as well as any other evidence of filesystem integrity.

A verification module may be employed which calculates the checksum of all files stored. These checksums are then saved for later use. If verification is needed, the checksum of each file may be compared to said saved checksums. As a result, a list, table of files or pointers to files which seem to have been damaged or lost is output by the verification module. As illustrated in FIGS. 5A and 5B, the verification module (not shown) may be connected to line 63. The verification process provides the required input to the encoding/update unit 55.

Upon such verification, the "coding" phase generates, or updates, encoded parity bits for the current, verified files (message bits). Alternatively, in the event that verification fails, those files which were identified by the verification module as being damaged or lost are restored as follows. Those data files and parities which are intact (which are not lost or corrupted) are decoded to generate the corrected data files. These files are then written back into the storage section.

The present invention and modifications thereof, allow realization of systems which efficiently protect against loss of data.

It is an advantage of the present invention that it is fast and reliable. The storage space needed is much smaller than in case of conventional backup systems.

The present invention can also be used if data loss is caused by independent events, such as cosmic rays striking the storage medium where the files are stored.

What is claimed is:

1. Method for backing up at least one file of a plurality of files stored in a storage medium, comprising the steps of:
   computing a set of redundant parity symbols by encoding cross-sections across said plurality of files using a systematic code, and
   storing said parity symbols.

2. The method of claim 1, wherein from time to time a new set of parity symbols is computed.

3. The method of claim 1, wherein a new set of parity symbols is computed upon request by an application program or upon request by a user.

4. The method of claim 1, wherein said systematic code is either an error-correction code or an erasure code.

5. The method of claim 1, wherein said systematic code is a block code.

6. The method of claim 1, wherein said systematic code is a sparse code, and in particular a two-tree code.

7. The method of claim 1, wherein said redundant parity symbols and said plurality of files are stored in different logical or physical storage sections of one and the same storage medium.

8. The method of claim 1, wherein said redundant parity symbols and said plurality of files are stored in separate storage media.

9. Method for reconstructing a lost or damaged file, or a part thereof, stored in a storage medium in conjunction with at least one other file as a plurality of files, said method comprising steps of:
   performing a preliminary step of generating and storing a set of redundant parity symbols which are computed by encoding cross-sections across said plurality of files using a systematic code,
   decoding said set of redundant parity symbols and said lost or damaged file, or a part thereof, and
   applying an exclusive-or operation using said decoded set of redundant parity symbols and said lost or damaged file, or a part thereof, as input, in order to reconstruct said lost or damaged file, or part thereof.

10. The method of claim 9, wherein said systematic code is either an error-correction code or an erasure code.

11. The method of claim 9, wherein said systematic code is a block code.

12. The method of claim 9, wherein said systematic code is a sparse code, and in particular a two-tree code.

13. The method of claim 9, wherein said redundant parity symbols and said plurality of files are stored in different logical or physical storage sections of one and the same storage medium.

14. The method of claim 9, wherein the reconstruction of a lost or damaged file, or a part thereof, is initiated by a verification module.

15. The method of claim 14, wherein said verification module identifies said lost or damaged file, or a part thereof.

16. The method of claim 14, wherein said verification module computes a current checksum and compares it to a saved checksum to identify said lost or damaged file.

17. The method of claim 14, wherein said verification module checks whether a set of files, a file, or a part thereof, has been corrupted by a computer virus.

18. A system for backing up a plurality of files stored in a storage medium, comprising:
   an input port for feeding said plurality of files in an encoding unit,
   said encoding unit for computing a set of redundant parity symbols by encoding cross-sections across said plurality of files using a systematic code, and
   a storage section for storing said parity symbols.

19. The system of claim 18, additionally comprising an update unit which is employed to update said set of redundant parity symbols if one or more files of said plurality of files are changed.

20. The system of claim 19, wherein said update unit is provided with old and new values of said one or more changed files, and which updates those parity symbols of said set of redundant parity symbols which are affected by the file change.

21. The system of claim 19, comprising a timer which triggers from time to time the computation of said updated set of parity symbols.

22. The system of claim 19, wherein said computation of an updated set of parity symbols is triggered manually or automatically.

23. The system of claim 18, wherein said systematic code used by said encoding unit is either an error-correction code, or an erasure code.

24. The system of claim 18, wherein said systematic code used by said encoding unit is a block code.

25. The system of claim 18, wherein said systematic code used by said encoding unit is a sparse code, and in particular a two-tree code.

26. The system of claim 18, wherein said redundant parity symbols and said plurality of files are stored in different logical or physical storage sections of one and the same storage medium.

27. The system of claim 18, wherein said redundant parity symbols and said plurality of files are stored in separate storage media.

28. The system of claim 18, further comprising a verification module which identifies corrupted, damaged or lost files.

29. The system of claim 28, wherein said verification module comprises a virus detection software for identifying files infected by a virus.

30. The system of claim 18, wherein said encoding unit is also employed for updating said set of parity symbols.

31. The system of claim 18, wherein said systematic codes employed by said encoding unit preserve the original bits of said plurality of files such that said plurality of files stored in a storage medium are in the clear.

32. A system according to claim 18, wherein said plurality of files are computer files stored in a storage medium that is at least one of part of a computer or bidirectionally coupled to a computer.

33. A system according to claim 18, wherein said system is part of a file backup system.

34. A system according to claim 18, wherein said system is part of a virus disinfection system.

35. A system according to claim 18, wherein said system is part of an anti-virus protection system.

36. A method for anti-virus protection of files, comprising the steps of:

extracting redundant information pertaining to each file to be protected, computing and storing parity bits for the extracted redundant information, wherein each said file to be protected is one of a set of files and said steps of extracting and computing comprise steps of computing a set of redundant parity bits by encoding cross-sections across said set of files using a systematic code, and then storing said parity bits, detecting viral damage to one or more of said files to be protected, using the stored parity bits and said redundant information for files not affected by viral damage to restore the redundant information for the one or more files affected by viral damage, and using said redundant information and the one or more files affected by viral damage to restore each such file to its state prior to viral infection.

37. A method as in claim 36, wherein at least one file of the set of files has a length that differs from a length of others of the set of files.

\* \* \* \* \*